United States Patent
Deng et al.

(10) Patent No.: US 9,491,720 B2
(45) Date of Patent: Nov. 8, 2016

(54) METHOD, PROCESSOR, AND USER EQUIPMENT FOR TRANSMITTING AT REDUCED TRANSMISSION POWER TO SAVE POWER CONSUMPTION OF USER EQUIPMENT

(71) Applicant: Huawei Device Co., Ltd., Shenzhen (CN)

(72) Inventors: Yu Deng, Shanghai (CN); Wei Xu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 135 days.

(21) Appl. No.: 14/145,343

(22) Filed: Dec. 31, 2013

(65) Prior Publication Data

US 2014/0213314 A1    Jul. 31, 2014

Related U.S. Application Data

(63) Continuation of application No. PCT/CN2013/071240, filed on Jan. 31, 2013.

(51) Int. Cl.
*H04B 7/00* (2006.01)
*H04W 52/36* (2009.01)
(Continued)

(52) U.S. Cl.
CPC ......... *H04W 52/367* (2013.01); *H04W 52/028* (2013.01); *H04W 52/52* (2013.01)

(58) Field of Classification Search
CPC .............. H03G 3/3068; H03G 1/0023; H03G 3/3036; H03G 3/3052; H04B 1/04; H04B 1/30; H04B 2001/0416; H04H 20/02; Y02B 60/50

USPC ............... 455/522, 574, 115.1–115.3, 127.1, 455/127.2, 127.3, 127.5; 330/123, 127, 330/129, 302, 329; 375/297; 713/300, 320, 713/323, 340
See application file for complete search history.

(56) References Cited

U.S. PATENT DOCUMENTS 5,909,643 A    6/1999   Aihara
7,962,108 B1   6/2011   Khlat et al.
(Continued)

FOREIGN PATENT DOCUMENTS

CN    1154610 A      7/1997
CN    102318426 A    1/2012
(Continued)

OTHER PUBLICATIONS

Foreign Communication From A Counterpart Application, PCT Application No. PCT/CN2013/071240, English Translation of International Search Report dated Oct. 3, 2013, 2 pages.
(Continued)

Primary Examiner — Shaima Q Aminzay
(74) Attorney, Agent, or Firm — Conley Rose, P.C.

(57) ABSTRACT

A signal sending method and apparatus are provided, and relate to the field of communications, so as to prevent a user equipment (UE) from sending a signal at maximum transmit power adjusted through automatic gain control (AGC) after a power amplifier (PA) is started. The method includes: setting, by a UE, transmit power of the UE after an uplink PA of the UE is turned off, where the transmit power of the UE is less than maximum output power of the uplink PA; when the PA is started, sending a signal at the transmit power of the UE. The embodiments of the present invention are used to send a signal.

5 Claims, 6 Drawing Sheets

(51) Int. Cl.
*H04W 52/02* (2009.01)
*H04W 52/52* (2009.01)

(56) References Cited

U.S. PATENT DOCUMENTS

| | | | |
|---|---|---|---|
| 8,095,091 B1* | 1/2012 | Kopikare | H03G 3/3042 455/115.1 |
| 2004/0110475 A1 | 6/2004 | Korol | |
| 2008/0160934 A1 | 7/2008 | Nakamura et al. | |
| 2011/0105173 A1 | 5/2011 | Haim et al. | |
| 2011/0222455 A1 | 9/2011 | Hou et al. | |
| 2013/0028231 A1 | 1/2013 | Zhang et al. | |
| 2013/0279429 A1* | 10/2013 | Magne | H04H 20/42 370/329 |

FOREIGN PATENT DOCUMENTS

| | | |
|---|---|---|
| CN | 102577541 A | 7/2012 |
| CN | 102812759 A | 12/2012 |
| JP | 2001186029 A | 7/2001 |
| KR | 20010038111 A | 5/2001 |
| WO | 2008081632 A1 | 7/2008 |
| WO | 2011147450 A1 | 12/2011 |

OTHER PUBLICATIONS

Foreign Communication From A Counterpart Application, PCT Application No. PCT/CN2013/071240, Written Opinon dated Oct. 3, 2013, 4 pages.

Partial English Translation and Abstract of Japanese Patent Application No. JP2001186029, Sep. 18, 2015, 16 pages.

Foreign Communication From A Counterpart Application, Japanese Application No. 2014-559067, English Translation of Japanese Office Action dated Jul. 7, 2015, 5 pages.

Foreign Communication From A Counterpart Application, Chinese Application No. 201380000203.4, Chinese Notice of Allowance dated Jun. 6, 2016, 4 pages.

* cited by examiner

METHOD, PROCESSOR, AND USER EQUIPMENT FOR TRANSMITTING AT REDUCED TRANSMISSION POWER TO SAVE POWER CONSUMPTION OF USER EQUIPMENT

CROSS-REFERENCE TO RELATED APPLICATION

This application is a continuation of International Application No. PCT/CN2013/071240, filed on Jan. 31, 2013, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications, and in particular, to a signal sending method and apparatus.

BACKGROUND

Quick power control (QPC) is a brand-new user equipment technology, aims at reducing power consumption of a user equipment, and rapidly controls an uplink power amplifier (PA) of the user equipment. According to this technology, after the user equipment (UE) completes sending a signal, the uplink power amplifier is rapidly turned off, and when there is a signal to be sent, the uplink power amplifier is started, thereby ensuring normal sending of a user signal, and saving the power consumption of the user equipment.

In a code division multiple access (CDMA) system, in order to keep constant transmit power, the user equipment adopts a cascading manner of a variable gain amplifier and a fixed gain amplifier to control the variable gain amplifier through an automatic gain control (AGC) technology, and adopts a manner of closed-loop power control to ensure that output power stably meets a requirement.

In a current QPC application, after the UE sends the signal, the UE turns off the uplink PA. However, due to a closed-loop negative feedback function of the AGC, the UE still increases, through the AGC, a gain on transmit power of the UE by the uplink PA, until the transmit power of the UE is increased to maximum transmit power. In this way, before the UE sends a signal again, the UE restarts the PA. In this case, the PA is started at a full gain, so that when the UE sends the signal, the UE sends the signal at the maximum transmit power, which causes a waste of the transmit power of the UE.

SUMMARY

Embodiments of the present invention provide a signal sending method and apparatus, so as to prevent a UE from sending a signal at maximum transmit power after a PA is started.

In a first aspect, a signal sending method is provided and includes: setting transmit power of a UE after an uplink PA of the UE is turned off, where the transmit power of the UE is less than maximum output power of the uplink PA; and sending a signal at the transmit power of the UE when the PA is started.

In a first possible implementation manner of the first aspect, the transmit power of the UE is transmit power before the uplink PA of the UE is turned off.

In combination with the first aspect or the first possible implementation manner of the first aspect, in a second possible implementation manner, the setting transmit power of a UE includes: stopping a gain on the transmit power of the UE through AGC; and limiting maximum transmit power of the UE to the transmit power of the UE.

In combination with the first possible implementation manner or the second possible implementation manner, in a third possible implementation manner, the method further includes: preserving the transmit power of the UE before the uplink PA is turned off.

In combination with the second possible implementation manner or the third possible implementation manner, in a fourth possible implementation manner, the method further includes: starting the gain on the transmit power of the UE through the AGC after the uplink PA is started; and canceling limitation to the maximum transmit power of the UE.

In combination with the fourth possible implementation manner, in a fifth possible implementation manner, the starting the gain on the transmit power of the UE through the AGC after the uplink PA is started, and canceling limitation to the maximum transmit power of the UE includes: after the uplink PA is started, starting the gain on the transmit power of the UE through the AGC and canceling the limitation to the maximum transmit power of the UE within 10 milliseconds.

In a second aspect, a processor is provided and includes: a processing circuit and a storage circuit, where the storage circuit stores a computer execution instruction, and the processing circuit is connected to the storage circuit through a communication bus; when the processing circuit is in operation, the processing circuit executes the computer execution instruction stored by the storage circuit, so that the processing circuit is configured to set transmit power of a UE after an uplink PA of the UE is turned off, where the transmit power of the UE is less than maximum output power of the uplink PA, and when the PA is started, send a signal at the transmit power of the UE.

In a first possible implementation manner of the second aspect, the transmit power of the UE is transmit power before the uplink PA of the UE is turned off.

In combination with the second aspect or the first possible implementation manner of the second aspect, in a second possible implementation manner, the processing circuit is further configured to stop a gain on the transmit power of the UE through AGC, and limit maximum transmit power of the UE to the transmit power of the UE.

In combination with the first possible implementation manner or the second possible implementation manner, in a third possible implementation manner, the storage circuit is further configured to preserve the transmit power of the UE before the uplink PA is turned off.

In combination with the second possible implementation manner or the third possible implementation manner, in a fourth possible implementation manner, the processing circuit is further configured to, after the uplink PA is started, start the gain on the transmit power of the UE through the AGC and cancel limitation to the maximum transmit power of the UE.

In combination with the fourth possible implementation manner, in a fifth possible implementation manner, the processing circuit is specifically configured to, after the uplink PA is started, start the gain on the transmit power of the UE through the AGC and cancel the limitation to the maximum transmit power of the UE within 10 milliseconds.

In a third aspect, a processor is provided and includes: a setting circuit configured to set transmit power of a UE after an uplink PA of the UE is turned off, where the transmit power of the UE is less than maximum output power of the uplink PA; and a communication circuit configured to send a signal at the transmit power of the UE when the PA is started.

In a first possible implementation manner of the third aspect, the transmit power of the UE is transmit power before the uplink PA of the UE is turned off.

In combination with the third aspect or the first possible implementation manner of the third aspect, in a second possible implementation manner, the setting circuit is further configured to stop a gain on the transmit power of the UE through AGC, and limit maximum transmit power of the UE to the transmit power of the UE.

In combination with the first possible implementation manner or the second possible implementation manner, in a third possible implementation manner, the setting circuit is further configured to preserve the transmit power of the UE before the uplink PA is turned off.

In combination with the second possible implementation manner or the third possible implementation manner, in a fourth possible implementation manner, the setting circuit is further configured to, after the uplink PA is started, start the gain on the transmit power of the UE through the AGC, and cancel limitation to the maximum transmit power of the UE.

In combination with the fourth possible implementation manner, in a fifth possible implementation manner, the setting circuit is specifically configured to, after the uplink PA is started, start the gain on the transmit power of the UE through the AGC and canceling the limitation to the maximum transmit power of the UE within 10 milliseconds.

In a fourth aspect, a UE is provided and includes the processor described in the second aspect or the processor described in the third aspect, an AGC controller, a transceiver, and an uplink PA, where the uplink PA is configured to perform power amplification on a signal; the AGC controller is configured to, after the uplink PA is turned off, increase a gain on transmit power provided by the uplink PA; and the transceiver is configured to send the signal according to the transmit power.

In a first possible implementation manner of the third aspect, the processor is a baseband chip.

By adopting the foregoing solutions, after the UE turns off the uplink PA, the UE sets the transmit power of the UE, where the transmit power of the UE is less than the maximum output power of the uplink PA, so as to prevent the UE from sending the signal at the maximum transmit power after the uplink PA is started, thereby saving power consumption of the UE.

BRIEF DESCRIPTION OF THE DRAWINGS

To describe the technical solutions in the embodiments of the present invention or in the prior art more clearly, accompanying drawings required for describing the embodiments or the prior art are introduced briefly in the following. The accompanying drawings in the following description merely show some embodiments of the present invention, and persons of ordinary skill in the art may further obtain other drawings according to these accompanying drawings without creative efforts.

DETAILED DESCRIPTION

The technical solutions in the embodiments of the present invention are clearly and completely described in the following with reference to the accompanying drawings in the embodiments of the present invention. Obviously, the embodiments to be described are only a part rather than all of the embodiments of the present invention. All other embodiments obtained by persons of ordinary skill in the art based on the embodiments of the present invention without creative efforts shall fall within the protection scope of the present invention.

Figure 1:
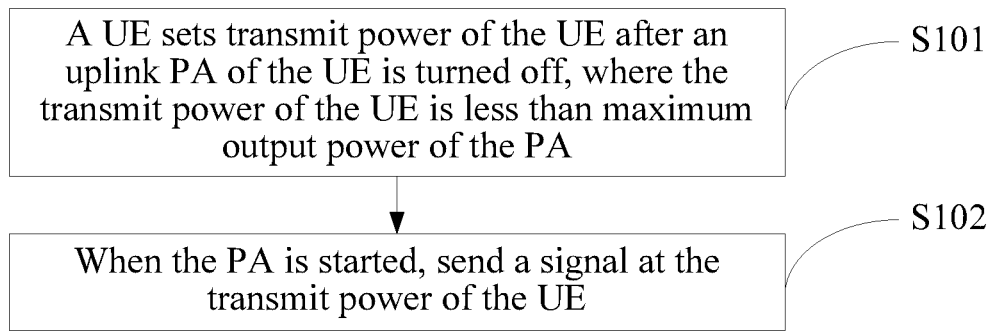
FIG. 1 is a schematic diagram of a signal sending method according to an embodiment of the present invention.

An embodiment of the present invention provides a signal sending method, where as shown in FIG. 1, an execution body of the method is a UE, and the method includes:

S101: A UE sets transmit power of the UE after an uplink PA of the UE is turned off, where the transmit power of the UE is less than maximum output power of the PA.

Specifically, when the UE sends a signal to a base station through an uplink, the uplink PA is in a started state, thereby ensuring performance of signal sending of the UE; after the UE completes sending the signal, the UE turns off the uplink PA, so as to reduce power consumption of the UE, where the signal is a carrier used to transmit various kinds of information such as data, command, and message.

Optionally, the transmit power set by the UE is transmit power before the uplink PA of the UE is turned off.

Further, before the uplink PA of the UE is turned off, the UE preserves the transmit power of the UE before the uplink PA is turned off, so that the UE sets the transmit power of the UE to the transmit power of the UE before the uplink PA is turned off.

S102: When the PA is started, send a signal at the transmit power of the UE.

Specifically, that the UE sets the transmit power of the UE may be completed through the following steps: The UE stops a gain on the transmit power of the UE through AGC, and limits maximum transmit power of the UE to the transmit power of the UE.

AGC is a closed-loop negative feedback function implemented by an AGC controller in the UE, and aims at enabling an output signal of the UE to automatically adjust a gain on transmit power of the uplink PA through closed-loop negative feedback when an input signal varies considerably, so that the output signal keeps basically unchanged or fluctuates within a relatively small range, thereby achieving an effect of keeping the output signal constant, that is to say, after the UE turns off the uplink PA, due to the closed-loop negative feedback function of the AGC, the transmit power of the UE continues to be increased to the maximum transmit power of the UE by increasing the gain on the uplink PA; when power adjustment is performed, the AGC is restrained by the maximum transmit power, and transmit power that can be adjusted through the AGC does not exceed the maximum transmit power.

Specifically, a stop instruction is written in a storage which controls a state of the AGC and is in the UE, and the stop instruction may be written in the storage through a write instruction of software; before the UE sends a signal, a baseband chip in the UE executes the stop instruction after the baseband chip in the UE determines that the signal is not sent and by reading an enable end of the uplink PA or by reading, through a processor in the baseband chip, whether a global variable which corresponds to the uplink PA and is stored in the storage is set (if the global variable is 0, it is determined that the uplink PA is in a started state; if the global variable is set to 1 instead of 0, it is determined that the uplink PA is in a turn-off state), determines that the uplink PA is turned off, so as to stop the gain on the transmit power of the UE through the AGC by the UE; likewise, a limitation instruction is written in the storage which controls the state of the AGC and is in the UE, and specifically, the limitation instruction may be written in the storage through the write instruction of the software; before the UE sends a signal, the baseband chip in the UE executes the limitation instruction after the baseband chip in the UE determines that the signal is not sent and by reading the enable end of the uplink PA or by reading whether the global variable which corresponds to the uplink PA and is in the baseband chip is set, determines that the uplink PA is turned off, so as to limit the maximum transmit power of the UE adjusted through the AGC to the transmit power of the UE.

It should be noted that, the UE stops the gain on the transmit power of the UE through the AGC by the UE, which prevents the UE from increasing the transmit power of the UE through the AGC after the PA is started. Specifically, in the prior art, after the uplink PA is turned off, the UE increases a bias voltage of the uplink PA through the AGC to a maximum bias voltage; after the uplink PA is started, because the UE reaches the maximum bias voltage at the uplink PA, the transmit power of the UE may exceed the maximum transmit power, thereby causing a waste of the transmit power of the UE; therefore, in the embodiment of the present invention, the UE stops the gain on the transmit power of the UE through the AGC by the UE, thereby preventing increasing of the transmit power of the UE due to the closed-loop negative feedback function of the AGC after the uplink PA is turned off.

In addition, the UE limits the maximum transmit power of the UE to the transmit power of the UE, and the transmit power of the UE is less than the maximum output power of the uplink PA, which prevents the UE from sending the signal at the maximum transmit power after the uplink PA is started due to closed-loop power control over the UE by the base station. Specifically, the base station sends the maximum transmit power to the UE; after the uplink PA is started, the UE adjusts the transmit power of the UE to the maximum transmit power and sends the signal according to the maximum transmit power. The closed-loop power control means that the UE controls, according to a signal fed back by the base station, the transmit power of the UE for sending the signal, so that transmit power of all UEs in a cell for sending a signal to the base station is the same, thereby ensuring that the base station provides a stable service for the UE. Therefore, in the embodiment of the present invention, the UE limits the maximum transmit power of the UE to the transmit power of the UE, which prevents the UE from sending the signal at the maximum transmit power due to the closed-loop power control over the UE by the base station after the PA is started.

It may be known from the foregoing, that the UE stops the gain on the transmit power of the UE through the AGC and the UE limits the maximum transmit power of the UE to the transmit power of the UE are two necessary steps for implementing the setting of the transmit power of the UE in this embodiment. The UE stops the gain on the transmit power of the UE through the AGC, so as to prevent increasing of the transmit power of the UE due to the closed-loop negative feedback function of the AGC after the PA is turned off; the UE limits the maximum transmit power of the UE to the transmit power of the UE, so as to prevent the UE from sending the signal at the maximum transmit power due to the closed-loop power control over the UE by the base station after the PA is started.

It should be noted that, there is no limitation on an absolute implementation sequence of the following steps:

The UE stops the gain on the transmit power of the UE through the AGC and the UE limits the maximum transmit power of the UE to the transmit power of the UE. The UE may first stop the gain on the transmit power of the UE through the AGC by the UE, and then limit the maximum transmit power of the UE to the transmit power of the UE; the UE may also first limit the maximum transmit power of the UE to the transmit power of the UE, and then stop the gain on the transmit power of the UE through the AGC by the UE, which is not limited in the present invention.

Further, before the UE sends the signal, the UE starts the uplink PA. In this case, the UE needs to recover control over the transmit power through the AGC, to ensure that the transmit power of the UE can meet a requirement for sending a signal. Therefore, after the uplink PA is started, the UE starts the gain on the transmit power of the UE through the AGC by the UE, and cancels the limitation to the maximum transmit power of the UE.

It should be noted that, after the uplink PA is started, the UE may start the gain on the transmit power of the UE through the AGC and cancel the limitation to the maximum transmit power of the UE within 10 milliseconds (ms), thereby ensuring the transmit power for the UE to send the signal.

By adopting the solution in which the executive body is the UE, after the UE turns off the uplink PA, the UE sets the transmit power of the UE, where the transmit power of the UE is less than the maximum output power of the uplink PA, so as to prevent the UE from sending the signal at the maximum transmit power after the uplink PA is started, thereby saving power consumption of the UE.

Figure 2:
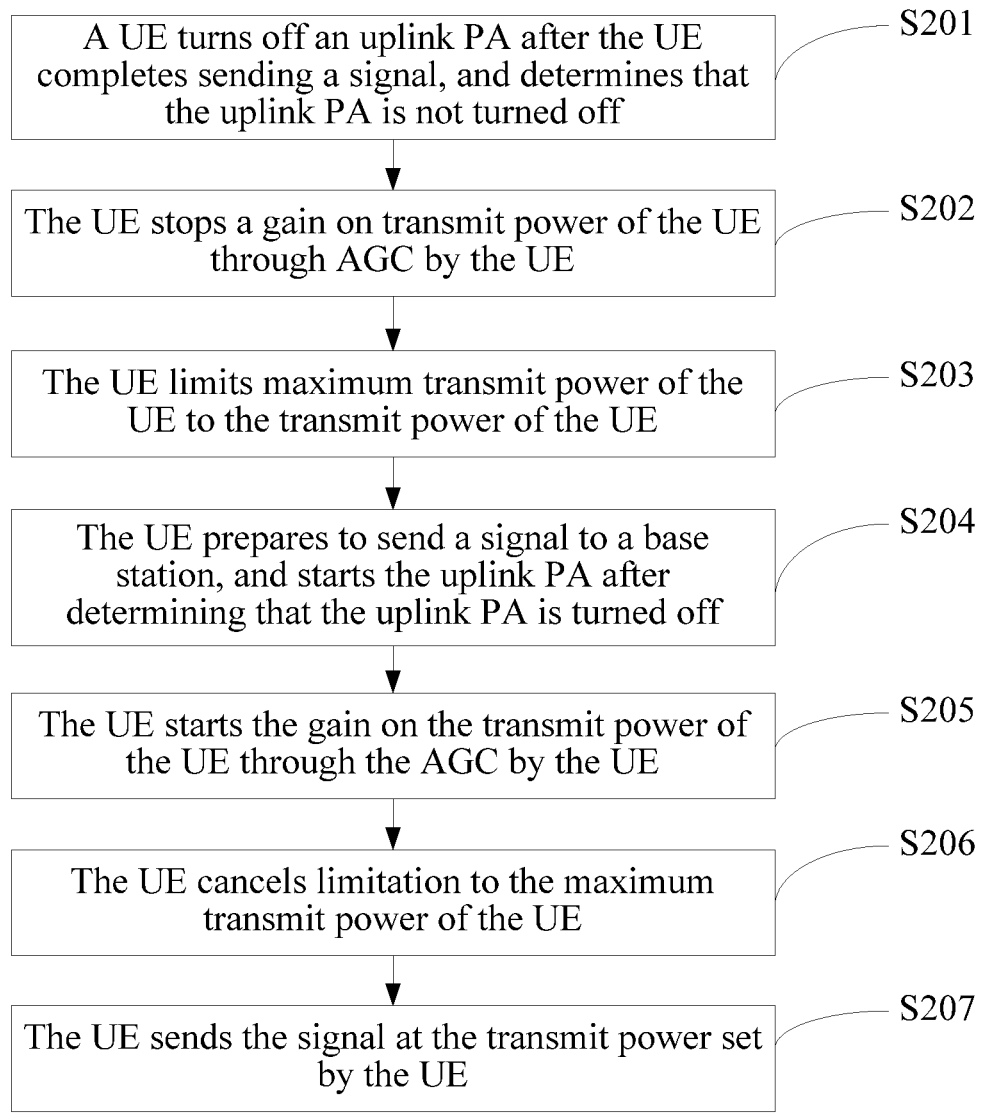
FIG. 2 is a schematic flow chart of a signal sending method according to an embodiment of the present invention.

An embodiment of the present invention provides a signal sending method, where as shown in FIG. 2, the method includes:

S201: A UE turns off an uplink PA after the UE completes sending a signal and determines that the uplink PA is not turned off.

The signal is a carrier used to transmit various kinds of information such as data, command, and message.

Specifically, the UE sends a signal to a base station through an uplink; in this case, the uplink PA is in a started state, thereby ensuring performance of signal sending of the UE; after the UE completes sending the signal, the UE turns off the uplink PA, so as to reduce power consumption of the UE.

S202: The UE stops a gain on transmit power of the UE through AGC by the UE.

AGC is a closed-loop negative feedback function implemented by an AGC controller in the UE, and aims at enabling an output signal of the UE to automatically adjust a gain on transmit power of the uplink PA through closed-loop negative feedback when an input signal varies considerably, so that the output signal keeps basically unchanged or fluctuates within a relatively small range, thereby achieving an effect of keeping the output signal constant, that is to say, after the UE turns off the uplink PA, due to the closed-loop negative feedback function of the AGC, the transmit power of the UE continues to be increased to maximum transmit power of the UE by increasing the gain on the uplink PA; when power adjustment is performed, the AGC is restrained by the maximum transmit power, and transmit power that can be adjusted through the AGC does not exceed the maximum transmit power.

Specifically, a stop instruction is written in a storage which controls a state of the AGC and is in the UE, and specifically, the stop instruction may be written in the storage through a write instruction of software; before the UE sends a signal, a baseband chip in the UE executes the stop instruction after the baseband chip in the UE determines that the signal is not sent and by reading an enable end of the uplink PA or by reading, through a processor in the baseband chip, whether a global variable which corresponds to the uplink PA and is stored in the storage is set (if the global variable is 0, it is determined that the uplink PA is in a started state; if the global variable is set to 1 instead of 0, it is determined that the uplink PA is in a turn-off state), determines that the uplink PA is turned off, so as to stop the gain on the transmit power of the UE through the AGC by the UE.

S203: The UE limits the maximum transmit power of the UE to the transmit power of the UE.

Specifically, a limitation instruction is written in the storage which controls the state of the AGC and is in the UE, and specifically, the limitation instruction may be written in the storage through the write instruction of the software; before the UE sends a signal, the baseband chip in the UE executes the limitation instruction after the baseband chip in the UE determines that the signal is not sent and by reading the enable end of the uplink PA or by reading whether the global variable which corresponds to the uplink PA and is in the baseband chip is set, determines that the uplink PA is turned off, so as to limit the maximum transmit power of the UE adjusted through the AGC to the transmit power of the UE.

It should be noted that, it is not limited that the foregoing step S203 is performed after step S202; in the embodiment of the present invention, step S203 may also be performed first, and then step S202 is performed, which is not limited herein.

S204: The UE prepares to send the signal to the base station, and starts the uplink PA after determining that the uplink PA is turned off.

In this case, the UE needs to recover control over the transmit power through the AGC, to ensure that the transmit power of the UE can meet a requirement for sending a signal.

S205: The UE starts the gain on the transmit power of the UE through the AGC by the UE.

S206: The UE cancels limitation to the maximum transmit power of the UE.

It should be noted that, after the uplink PA is started, the UE starts the gain on the transmit power of the UE through the AGC and cancels the limitation to the maximum transmit power of the UE within 10 ms, thereby ensuring the transmit power for the UE to send the signal.

Step S205 and step S206 are performed to recover a function of closed-loop control over the transmit power through the AGC, thereby ensuring transmitting performance of the UE.

It should be noted that, it is not limited that the foregoing step S206 is performed after step S205; in the embodiment of the present invention, step S206 may also be performed first, and then step S205 is performed, which is not limited herein.

S207: The UE sends the signal at the transmit power set by the UE.

It should be noted that, to simplify the description, the foregoing method embodiments are described as a combination of a series of actions; however, persons skilled in the art should be aware that, the present invention is not limited by a sequence of the described actions. Persons skilled in the art should also be aware that, the embodiments described in the specification are exemplary embodiments, and involved actions and circuits are not indispensable to the present invention.

By adopting the foregoing solutions, after the UE turns off the uplink PA, the UE sets the transmit power of the UE, where the transmit power of the UE is less than maximum output power of the uplink PA, so as to prevent the UE from sending the signal at the maximum transmit power after the uplink PA is started, thereby saving power consumption of the UE.

Figure 3:
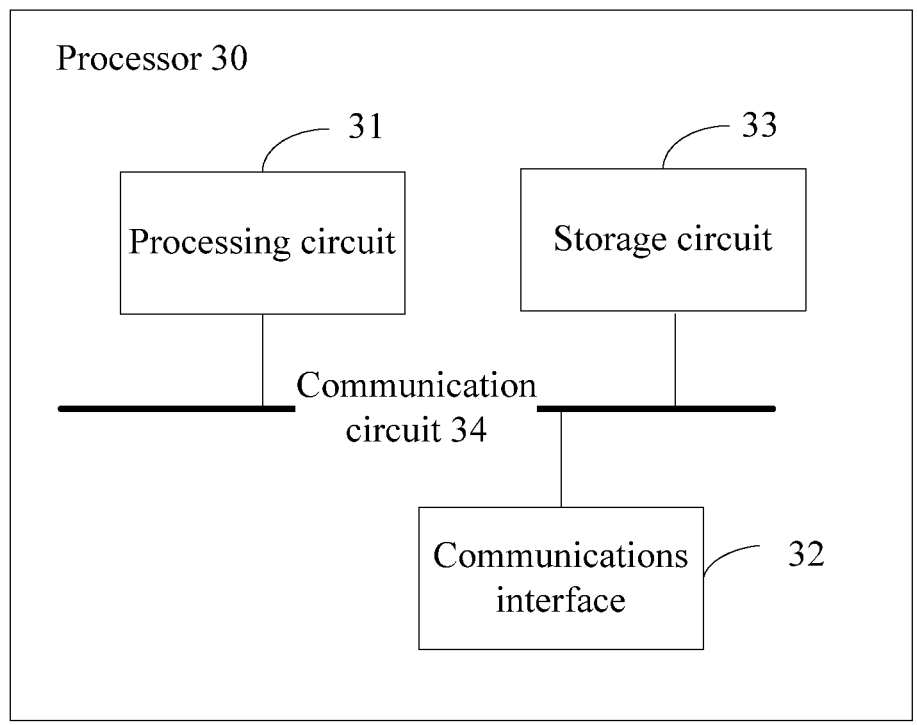
FIG. 3 is a schematic structural diagram of a processor according to an embodiment of the present invention.

An embodiment of the present invention provides a processor 30, where the processor may be applied in a UE; in the UE, the processor may be a baseband chip; and as shown in FIG. 3, the processor 30 includes: a processing circuit (processor) 31, a communications interface 32, a storage circuit (memory) 33 and a communication circuit 34; where the processing circuit 31, the communications interface 32 and the storage circuit 33 complete communicating with each other through the communication circuit 34.

The processing circuit 31 may be a central processing unit (CPU), or an application specific integrated circuit (ASIC), or may be configured to one or more integrated circuits implementing the embodiments of the present invention.

The storage circuit 33 is configured to store a program code, where the program code includes a computer operation instruction. The storage circuit 33 may include a high-speed random-access memory (RAM) memory, and may also include a non-volatile memory, such as at least one disk memory.

The communications interface 32 is configured to implement connection and communication between the processor 30 and other apparatuses.

The processing circuit 31 executes the program code, so as to set transmit power of a UE after an uplink PA of the UE is turned off, where the transmit power of the UE is less than maximum output power of the uplink PA, and when the PA is started, send a signal at the transmit power of the UE.

Optionally, the transmit power of the UE is transmit power before the uplink PA of the UE is turned off.

Further, the storage circuit 33 is further configured to preserve the transmit power of the UE before the uplink PA is turned off, so that the processor sets the transmit power of the UE to the transmit power of the UE before the uplink PA is turned off.

Further, the processing circuit 31 is specifically configured to stop a gain on the transmit power of the UE through AGC, and limit maximum transmit power of the UE to the transmit power of the UE.

AGC is a closed-loop negative feedback function implemented by an AGC controller in the UE, and aims at enabling an output signal of the UE to automatically adjust a gain on transmit power of the uplink PA through closed-loop negative feedback when an input signal varies considerably, so that the output signal keeps basically unchanged or fluctuates within a relatively small range, thereby achieving an effect of keeping the output signal constant, that is to say, after the UE turns off the uplink PA, due to the closed-loop negative feedback function of the AGC, the transmit power of the UE continues to be increased to the maximum transmit power of the UE by increasing the gain on the uplink PA; when power adjustment is performed, the AGC is restrained by the maximum transmit power, and transmit power that can be adjusted through the AGC does not exceed the maximum transmit power.

Specifically, a stop instruction is written in the storage circuit, and the stop instruction may be written in the storage circuit through a write instruction of software; before the UE sends a signal, the processing circuit executes the stop instruction after the processing circuit determines that the signal is not sent and by reading an enable end of the uplink PA or by reading, through the processing circuit in the baseband chip, whether a global variable which corresponds to the uplink PA and is stored in the storage circuit is set (if the global variable is 0, it is determined that the uplink PA is in a started state; if the global variable is set to 1 instead of 0, it is determined that the uplink PA is a turn-off state), determines that the uplink PA is turned off, so as to stop the gain on the transmit power of the UE through the AGC by the UE; likewise, a limitation instruction is written in the storage circuit, and specifically, the limitation instruction may be written in the storage circuit through the write instruction of the software; before the UE sends a signal, the processing circuit executes the limitation instruction after the processing circuit determines that the signal is not sent and by reading the enable end of the uplink PA or by reading whether the global variable which corresponds to the uplink PA and is in the baseband chip is set, determines that the uplink PA is turned off, so as to limit the maximum transmit power of the UE adjusted through the AGC to the transmit power of the UE.

It should be noted that, the processing circuit stops the gain on the transmit power of the UE through the AGC by the UE, which prevents the UE from increasing the transmit power of the UE through the AGC after the PA is started. Specifically, in the prior art, after the uplink PA is turned off, the processing circuit increases a bias voltage of the uplink PA through the AGC to a maximum bias voltage; after the uplink PA is started, because the UE reaches the maximum bias voltage at the uplink PA, the transmit power of the UE may exceed the maximum transmit power, thereby causing a waste of the transmit power of the UE; therefore, in the embodiment of the present invention, the processing circuit stops the gain on the transmit power of the UE through the AGC by the UE, thereby preventing increasing of the transmit power of the UE due to the closed-loop negative feedback function of the AGC after the uplink PA is turned off.

In addition, the processing circuit limits the maximum transmit power of the UE to the transmit power of the UE, and the transmit power of the UE is less than the maximum output power of the uplink PA, which prevents the UE from sending the signal at the maximum transmit power after the uplink PA is started due to closed-loop power control over the UE by the base station. Specifically, the base station sends the maximum transmit power to the UE; after the uplink PA is started, the processing circuit adjusts the transmit power of the processing circuit to the maximum transmit power and sends the signal according to the maximum transmit power. The closed-loop power control means that the UE controls, according to a signal fed back by the base station, the transmit power of the UE for sending the signal, so that transmit power of all UEs in a cell for sending a signal to the base station is the same, thereby ensuring that the base station provides a stable service for the UE. Therefore, in the embodiment of the present invention, the processing circuit limits the maximum transmit power of the UE to the transmit power of the UE, which prevents the UE from sending the signal at the maximum transmit power due to the closed-loop power control over the UE by the base station after the PA is started.

It may be known from the foregoing, that the processing circuit stops the gain on the transmit power of the UE through the AGC and the processing circuit limits the maximum transmit power of the UE to the transmit power of the UE are two necessary steps for implementing the setting of the transmit power of the UE in this embodiment. The processing circuit stops the gain on the transmit power of the UE through the AGC, so as to prevent increasing of the transmit power of the UE due to the closed-loop negative feedback function of the AGC after the PA is turned off; the processing circuit limits the maximum transmit power of the UE to the transmit power of the UE, so as to prevent the UE from sending the signal at the maximum transmit power due to the closed-loop power control over the UE by the base station after the PA is started.

Further, the processing circuit 31 is further configured to, after the uplink PA is started, start the gain on the transmit power of the UE through the AGC, and cancel the limitation to the maximum transmit power of the UE, so as to ensure that the transmit power of the UE can meet a requirement for sending a signal.

In addition, the processing circuit 31 is specifically configured to, after the uplink PA is started, start the gain on the transmit power of the UE through the AGC and cancel the limitation to the maximum transmit power of the UE within 10 milliseconds, thereby ensuring the transmit power for the UE to send the signal.

By adopting the foregoing processor, after the uplink PA is turned off, the processor sets the transmit power of the UE, where the transmit power of the UE is less than the maximum output power of the uplink PA, so as to prevent the UE from sending the signal at the maximum transmit power after the uplink PA is started, thereby saving power consumption of the UE.

Figure 4:
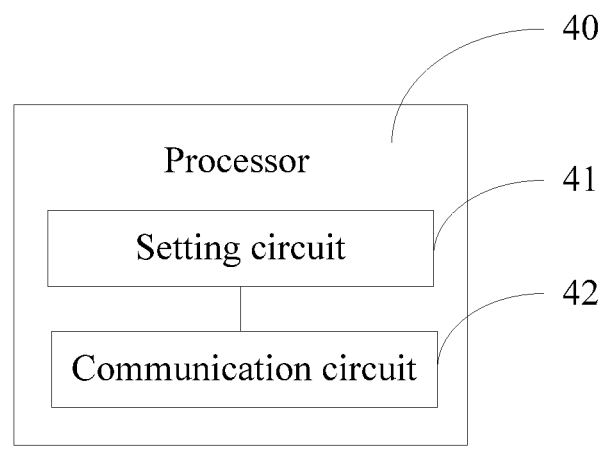
FIG. 4 is a schematic structural diagram of another processor according to an embodiment of the present invention.

An embodiment of the present invention provides a processor 40, where the processor may be a baseband chip; and as shown in FIG. 4, the processor 40 includes: a setting circuit 41 configured to set transmit power of a UE after an uplink PA of the UE is turned off, where the transmit power of the UE is less than maximum output power of the uplink PA; a communication circuit 42 configured to send a signal at the transmit power of the UE when the PA is started.

Optionally, the transmit power of the UE is transmit power before the uplink PA of the UE is turned off.

Further, the setting circuit 41 is further configured to stop a gain on the transmit power of the UE through AGC, and limit maximum transmit power of the UE to the transmit power of the UE.

AGC is a closed-loop negative feedback function implemented by an AGC controller in the UE, and aims at enabling an output signal of the UE to automatically adjust a gain on transmit power of the uplink PA through closed-loop negative feedback when an input signal varies considerably, so that the output signal keeps basically unchanged or fluctuates within a relatively small range, thereby achieving an effect of keeping the output signal constant, that is to say, after the UE turns off the uplink PA, due to the closed-loop negative feedback function of the AGC, the transmit power of the UE continues to be increased to the maximum transmit power of the UE by increasing the gain on the uplink PA; when power adjustment is performed, the AGC is restrained by the maximum transmit power, and transmit power that can be adjusted through the AGC does not exceed the maximum transmit power.

Further, the setting circuit 41 is further configured to preserve the transmit power of the UE before the uplink PA is turned off.

Further, the setting circuit 41 is further configured to, after the uplink PA is started, start the gain on the transmit power of the UE through the AGC and cancel the limitation to the maximum transmit power of the UE, so as to ensure that the transmit power of the UE can meet a requirement for sending a signal.

In addition, the setting circuit 41 is further configured to, after the uplink PA is started, start the gain on the transmit power of the UE through the AGC and cancel the limitation to the maximum transmit power of the UE within 10 milliseconds.

By adopting the foregoing processor, after the uplink PA is turned off, the processor sets the transmit power of the UE, where the transmit power of the UE is less than the maximum output power of the uplink PA, so as to prevent the UE from sending the signal at the maximum transmit power after the uplink PA is started, thereby saving power consumption of the UE.

Figure 5A:
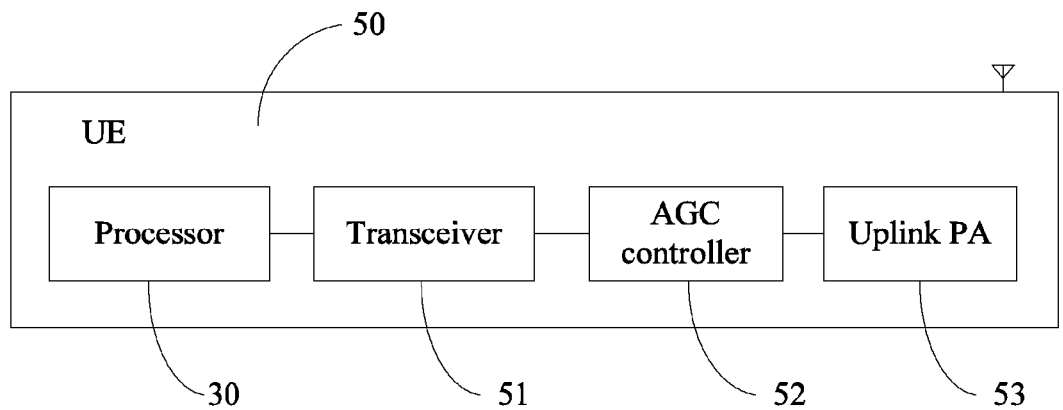
FIG. 5A is a schematic structural diagram of a UE according to an embodiment of the present invention.
Figure 5B:
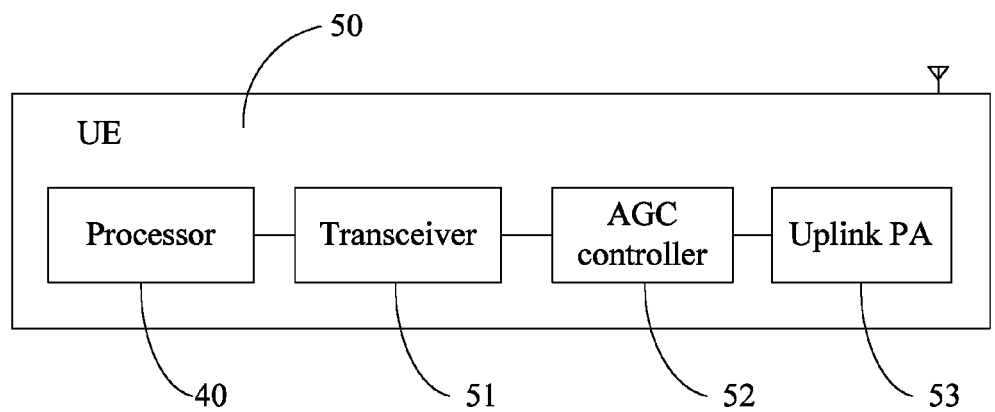
FIG. 5B is a schematic structural diagram of a UE according to an embodiment of the present invention.

An embodiment of the present invention provides a UE 50, where as shown in FIG. 5A or FIG. 5B, the UE 30 includes: the processor 30 described in the foregoing embodiment (corresponding to FIG. 5A) or the processor 40 described in the foregoing embodiment (corresponding to FIG. 5B), an AGC controller 51, a transceiver 52, and an uplink PA 53.

The uplink PA 53 is configured to perform power amplification on a signal.

The AGC controller 51 is configured to, after the uplink PA is turned off, increase a gain on transmit power provided by the uplink PA 34.

The transceiver 52 is configured to send the signal according to the transmit power.

Figure 6:
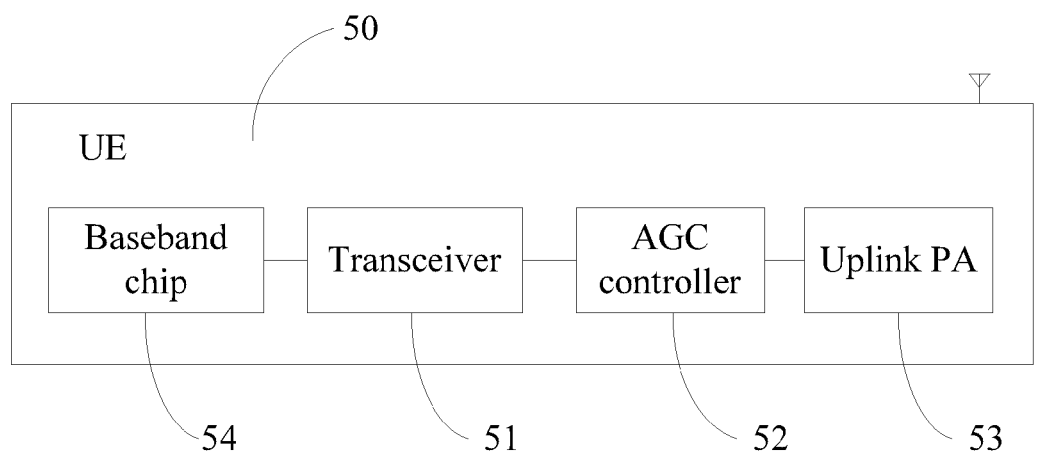
FIG. 6 is a schematic structural diagram of a UE according to an embodiment of the present invention.

Further, as shown in FIG. 6, each of the foregoing processor 30 and processor 40 may be a baseband chip 54 in the UE 50.

It should be noted that, the baseband chip is included in a baseband part of the UE, and the foregoing AGC controller, the transceiver and the uplink PA are included in a radio frequency part of the UE.

By adopting the foregoing UE, after the uplink PA is turned off, the UE sets the transmit power of the UE, where the transmit power of the UE is less than maximum output power of the uplink PA, so as to prevent the UE from sending the signal at the maximum transmit power after the uplink PA is started, thereby saving power consumption of the UE.

Persons of ordinary skill in the art may understand that all or a part of the steps that implement the foregoing method embodiments may be completed by a program instructing relevant hardware. The program may be stored in a computer readable storage medium. When the program is executed, the steps of the foregoing method embodiments are performed. The storage medium includes any medium that is capable of storing program code, such as a read-only memory (ROM), a RAM, a magnetic disk or an optical disc.

The foregoing description is merely specific implementation manners of the present invention, but is not intended to limit the protection scope of the present invention. Variations and modifications made by persons skilled in the art within the technical scope disclosed in the present invention shall fall within the protection scope of the present invention. Therefore, the protection scope of the present invention is subject to the protection scope of the claims.

What is claimed is:

1. A reduced transmission power sending method, comprising: turning off, before transmission, an uplink power amplifier (PA) of a user equipment (UE) to save a first transmit power of the UE; setting a second transmit power of the UE after the uplink PA of the UE is turned off to the first transmit power, wherein the second transmit power of the UE is less than a maximum output power of the uplink PA; realizing no gain on the second transmit power of the UE through automatic gain control (AGC); limiting a maximum transmit power of the UE, wherein the limited maximum transmit power is the second transmit power of the UE; starting the gain on the second transmit power of the UE through the AGC; and canceling limiting of the maximum transmit power of the UE within 10 milliseconds after the uplink PA is started; and sending a signal at the second transmit power of the UE when the uplink PA is started.

2. A processor, comprising: a processing circuit; and a storage circuit, wherein the storage circuit stores a computer execution instruction, wherein the processing circuit is connected to the storage circuit through a communication circuit, and wherein when the processing circuit is in operation, the processing circuit executes the computer execution instruction stored by the storage circuit such that the processing circuit is configured to: turn off, before transmission, an uplink power amplifier (PA) of a user equipment (UE) to save a first transmit power of the UE; set a second transmit power of the UE after the uplink PA of the UE is turned off to the first transmit power, wherein the second transmit power of the UE is less than a maximum output power of the uplink PA; realize no gain on the second transmit power of the UE through automatic gain control (AGC); limit a maximum transmit power of the UE, wherein the limited maximum transmit power is the second transmit power of the UE: start the gain on the second transmit power of the UE through the AGC; cancel limiting of the maximum transmit power of the UE within 10 milliseconds after the uplink PA is started; and send a signal at the second transmit power of the UE when the uplink PA is started.

3. A processor, comprising: a register configured to turn off, before transmission, an uplink power amplifier (PA) of a user equipment (UE) to save a first transmit power of the UE; a setting circuit configured to: set a second transmit power of the UE after the uplink PA of the UE is turned off to the first transmit power, wherein the second transmit power of the UE is less than a maximum output power of the uplink PA; realize no gain on the second transmit power of the UE through automatic gain control (AGC); and limit a maximum transmit power of the UE, wherein the limited maximum transmit power is the second transmit power of the UE; start the gain on the second transmit power of the UE through the AGC; and cancel limiting of the maximum transmit power of the UE within 10 milliseconds after the uplink PA is started; and a communication circuit configured to send a signal at the second transmit power of the UE when the uplink PA is started.

4. A user equipment (UE), comprising:
a processor;
an automatic gain control (AGC) controller;
a transceiver; and
an uplink power amplifier (PA),
wherein the uplink PA is configured to perform power amplification,
wherein the AGC controller is configured to, after the uplink PA is turned off, increase a gain on transmit power provided by the uplink PA,
wherein the transceiver is configured to send according to the transmit power,
wherein the processor comprises a processing circuit and a storage circuit,
wherein the storage circuit stores a computer execution instruction,
wherein the processing circuit is connected to the storage circuit through a communication circuit, and
wherein when the processing circuit is in operation, the processing circuit executes the computer execution instruction stored by the storage circuit such that the processing circuit is configured to:
 turn off, before transmission, the uplink PA of the UE to save a first transmit power of the UE;
 set a second transmit power of the UE after the uplink PA of the UE is turned off to the first transmit power, wherein the second transmit power of the UE is less than a maximum output power of the uplink PA;
 realize no gain on the second transmit power of the UE through AGC;
 limit a maximum transmit power of the UE, wherein the limited maximum transmit power is the second transmit power of the UE;
 start the gain on the second transmit power of the UE through the AGC;
 cancel limiting of the maximum transmit power of the UE within 10 milliseconds after the uplink PA is started; and
 send a signal at the second transmit power of the UE when the uplink PA is started.

5. A user equipment (UE), comprising: a processor; an automatic gain control (AGC) controller; a transceiver; and an uplink power amplifier (PA), wherein the uplink PA is configured to perform power amplification, wherein the AGC controller is configured to, after the uplink PA is turned off, increase a gain on transmit power provided by the uplink PA, wherein the transceiver is configured to send according to the transmit power, wherein the processor comprises a register, a setting circuit and a communication circuit, wherein the register configured to turn off, before transmission, the uplink PA of the UE to save a first transmit power of the UE wherein the setting circuit is configured to: set a second transmit power of the UE after the uplink PA of the UE is turned off to the first transmit power, wherein the second transmit power of the UE is less than a maximum output power of the uplink PA; realize no gain on the second transmit power of the UE through AGC; and limit a maximum transmit power of the UE, wherein the limited maximum transmit power is the second transmit power of the UE; start the gain on the second transmit power of the UE through the AGC; and cancel limiting of the maximum transmit power of the UE within 10 milliseconds after the uplink PA is started, and wherein the communication circuit is configured to send a signal at the second transmit power of the UE when the uplink PA is started.

* * * * *